United States Patent
Goldman et al.

(10) Patent No.: US 8,477,923 B2
(45) Date of Patent: Jul. 2, 2013

(54) MID-CALL HAND-OFF BETWEEN END USER TERMINALS

(75) Inventors: Stuart O. Goldman, Scottsdale, AZ (US); Kevin M. Patfield, Phoenix, AZ (US)

(73) Assignee: Alcatel Lucent, Paris (FR)

( * ) Notice: Subject to any disclaimer, the term of this patent is extended or adjusted under 35 U.S.C. 154(b) by 1408 days.

(21) Appl. No.: 11/165,365

(22) Filed: Jun. 23, 2005

(65) Prior Publication Data

US 2007/0004411 A1  Jan. 4, 2007

(51) Int. Cl.
*H04M 3/42* (2006.01)
*H04Q 7/20* (2006.01)

(52) U.S. Cl.
USPC ............ 379/212.01; 455/436; 455/439

(58) Field of Classification Search
USPC ............... 379/212.01; 455/436, 439
See application file for complete search history.

(56) References Cited

U.S. PATENT DOCUMENTS

| | | | |
|---|---|---|---|
| 5,604,791 A | 2/1997 | Lee | |
| 5,619,561 A | 4/1997 | Reese | |
| 6,574,216 B1* | 6/2003 | Farris et al. | 370/352 |
| 6,611,688 B1* | 8/2003 | Raith | 455/456.1 |
| 6,853,718 B1* | 2/2005 | Bedingfield et al. | 379/212.01 |
| 6,999,769 B1* | 2/2006 | Henon | 455/445 |
| 7,369,117 B2 | 5/2008 | Evans et al. | |
| 8,144,857 B1* | 3/2012 | Barlow et al. | 379/212.01 |
| 2005/0074111 A1* | 4/2005 | Hanson et al. | 379/212.01 |
| 2006/0077957 A1* | 4/2006 | Reddy et al. | 370/352 |
| 2006/0178173 A1 | 8/2006 | Miller | |
| 2007/0269027 A1 | 11/2007 | Lynam et al. | |
| 2008/0310371 A1* | 12/2008 | Russell | 370/331 |

* cited by examiner

*Primary Examiner* — Rasha Al Aubaidi
(74) *Attorney, Agent, or Firm* — Fay Sharpe LLP

(57) ABSTRACT

A method of supporting a mid-call hand-off feature (22) is provided in a telecommunications network (40). The method includes: connecting a first call through a first switching facility (20) of the telecommunications network (40) such that a first party served by the first switching facility (20) and a second party are participating in the call; making a decision to invoke the mid-call hand-off feature (22); placing a second call from the first switching facility (20) to a designated telephone number; and, connecting the second party to the second call.

20 Claims, 2 Drawing Sheets

MID-CALL HAND-OFF BETWEEN END USER TERMINALS

FIELD

The present inventive subject matter relates to the telecommunication arts. Particular application is found in conjunction with certain types of telecommunication networks, and the specification makes particular reference thereto. However, it is to be appreciated that aspects of the present inventive subject matter are also amenable to other like applications and/or networks.

BACKGROUND

Often a telephone subscriber or user may have access to multiple end user terminals (EUTs), which may each be associated with different networks or services. For example, a user may have a landline telephone at their home and/or one at their office, as well a mobile telephone. Alternately, a user may have multiple mobile telephones, e.g., one for work and one for personal use. In yet another case a user may have a single device that incorporates two or more separate EUTs such as a "dual mode" wireless device that can support voice communications over both cellular and WiFi networks.

In telecommunications networks, a call forwarding function or service is generally well known. Typically, when a call is placed by a calling party to a called party, e.g., over a public switched telephone network (PSTN), if the called party subscribes to the call forwarding feature or service and it has been previously activated by the called party, then the call is routed not to the directory number (DN) called or dialed by the calling party, but rather, to an alternate DN designated by the called party ahead of time, e.g., when the feature was previously activated. While generally adequate for its intended purpose, traditional call forwarding has certain limitations. For example, the feature is only effective for future calls. That is to say, the service is only effective at rerouting calls placed to the subscriber's DN after the call forwarding feature has been activated. More specifically, the call forwarding feature does not permit the forwarding of a call currently or already in progress.

Nevertheless, there are some times when a user may desire to forward a call already in progress from the current DN to another different DN. In other words, a user may desire, mid-call, to hand-off or transfer a call from the EUT currently being used to participate in the call to another different EUT. Consider, for example, a case where a call is currently in progress between two parties, and assume that one of the parties is using a mobile telephone to participate in the call. At some point during the call, the party on the mobile telephone may desire to have the call switched to a nearby or otherwise accessible landline telephone, e.g., because their mobile signal is getting weak, because they desire better sound quality, because they desire to conserve mobile air time minutes, because their mobile telephone's battery is running low, etc. In another example, a party currently participating in a call on their landline telephone, may desire to continue the call on their mobile telephone so that they can travel freely from the vicinity of their landline telephone, e.g., to run an errand, leave the office, head for a meeting, or for any other reason.

Traditional call forwarding does not accommodate the aforementioned situations. Consequently, the party desiring to switch to another EUT mid-call, typically has to let the other party known of their intent, then the parties hang-up (i.e., end the current call) so that a new call can be established using the other EUT. Such an option or approach, however, can be undesirable. For example, some telephone users may find it inconvenient, it may not be clear which party is to initiate the subsequent new call, or an ill timed intervening call may interrupt the parties' plans for the new call.

Accordingly, a new and improved mid-call hand-off service and/or feature is disclosed that overcomes the above-referenced problems and others.

SUMMARY

In accordance with one exemplary embodiment, a method of supporting a mid-call hand-off feature is provided in a telecommunications network. The method includes: connecting a first call through a first switching facility of the telecommunications network such that a first party served by the first switching facility and a second party are participating in the call; making a decision to invoke the mid-call hand-off feature; placing a second call from the first switching facility to a designated telephone number; and, connecting the second party to the second call.

In accordance with another aspect of the present inventive subject matter, a system for supporting a mid-call hand-off service in a telecommunications network includes: connecting means that connect a first call through a first switching facility of the telecommunications network such that a first party served by the first switching facility and a second party are participating in the call; invoking means that selectively invoke the mid-call hand-off service; calling means for placing a second call from the first switching facility to a designated telephone number in response to invocation of the mid-call hand-off service by the invoking means; and, bridging means that selectively bridge the second party to the second call after the second call has been placed.

In yet another exemplary embodiment, a switching facility is provided. Suitably, the switching facility is in operative communication with a telecommunications network and a first end user terminal that is provided access to the network by the switching facility. The switching facility includes: connecting means that selectively connects a first call through the switching facility such that the first end user terminal and a second end user terminal are connected on the first call; invoking means that selectively invokes a service; calling means that placing a second call from the switching facility to a designated telephone number in response to invocation of the service by the invoking means; and, bridging means that selectively bridges the second end user terminal to the second call after the second call has been placed.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF THE PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
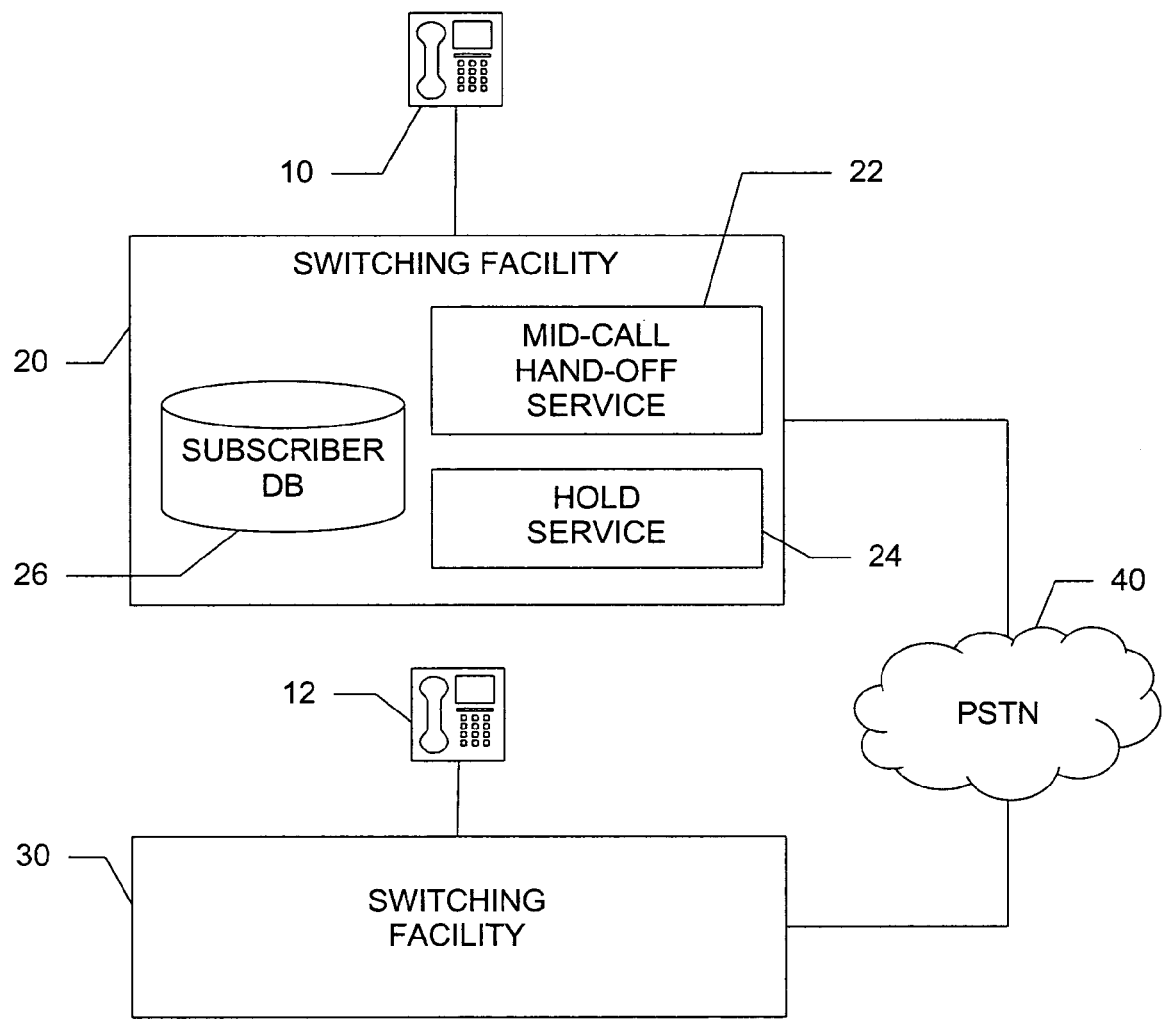
FIG. 1 is a block diagram illustrating an exemplary telecommunications network suitable for practicing aspects of the present inventive subject matter.

With reference to FIG. 1, a first end user terminal (EUT) 10 and a second EUT 12 are shown, via which telephone calls are selectively placed and/or received over a telecommunications network. Suitably, the EUTs 10 and 12 are in relatively close proximity to one another so that a user could readily access both. For example, the EUT 10 may be a mobile terminal carried on a user's person, while the EUT 12 may be a landline terminal in or near a room or other location were the user is or soon will be, however, not withstanding the forgoing examples, it is to be appreciated that, either or both EUTs may be mobile terminals, and either or both may be landline terminals.

The terminal 10 is served by a telecommunications switching facility 20 that is operatively connected to and/or in communication with a public switched telephone network (PSTN) 40 in the usual manner. Similarly, the terminal 12 is also served by a telecommunications switching facility 30 that is operatively connected to and/or in communication with the PSTN 40 in the usual manner. For simplicity and clarity herein, only two terminals and switching facilities are illustrated in the present example. However, it is to be appreciated that a single facility suitably serves a plurality of similar terminals and that a plurality of such facilities are similarly equipped and/or likewise arranged with respect to the PSTN 40. In any event, suitably, the switching facilities 20 and/or 30 are provided via any one or more of various suitable implementations.

For example, in the case of a landline or wireline application, the served terminal is optionally a landline telephone or other like end user telecommunication device or landline customer premises equipment (CPE), and the facility serving the terminal is an end office (EO) that is operatively connected to the PSTN 40 in the usual manner. Suitably, the EO includes a telecommunications switch (e.g., a class 5 switch such as the 5ESS or another like switch) to which the served terminal is operatively connected in the usual manner, e.g., via a twisted-pair landline cable or the like. Alternately, the switching facility takes the form of or is otherwise implemented as a private branch exchange (PBX) (which shall be used herein to also refer to a private automatic exchange (PAX) and/or a private automatic branch exchange (PABX) as well) or a Centrex® or another like switching facility that provides the served EUT with access to the PSTN 40.

In a wireless or mobile application, e.g., the facility serving the terminal is a mobile switching center (MSC) operatively connected to and/or in communication with the PSTN 40 in the usual manner. Suitably, the MSC is also operatively connected to and/or in communication with a plurality of base stations (not shown) in the usual manner. As is understood in the art, each base station (BS) provides an over-the-air radio frequency interface for its respective geographic area or cell. Selectively, the served terminal (which in this case is, e.g., a mobile or wireless telephone or other appropriate mobile station (MS)) is provided telecommunication services and/or otherwise accesses the network via the interface and/or the BS serving the cell in which the MS is located. Alternately, the served EUT is a VoIP (Voice over Internet Protocol) or other IP based terminal, and the switching facility serving it includes a wireless local area network (WLAN) or WiFi network that provides wireless extensions of PBX or Centrex® systems to the served terminal.

In one exemplary embodiment, the EUTs 10 and 12 are suitably combined in a so-called dual mode wireless device that incorporates in one device both a cellular wireless terminal connected through an MSC as described above and a VoIP endpoint connected through a WiFi link or similar means to a VoIP network with its own switching system, distinct from the MSC.

As shown, the facility 20 also includes or otherwise has access to a mid-call hand-off or transfer service 22, an optional hold service 24, and an optional subscriber database (DB) 26. Assuming a first party or subscriber currently participating in a call connected through the facility 20 (e.g., using the terminal 10) desires for what ever reason to have the call switched or handed-off mid-call from the EUT 10 to another terminal (e.g., EUT 12), optionally served by another facility (e.g., the facility 30), then the facility 20 invokes the mid-call hand-off service 22. Depending upon the particular circumstances, the service 22 may be automatically invoked by the facility 20 or the service 22 may be invoked by the facility 20 at the instruction of the party using the EUT 10.

For example, the first party or subscriber optionally dials a prescribed feature code using the EUT 10 to instruct the facility 20 to invoke the service 22. Alternately, the facility 20 optionally detects a condition that has been prearranged or set by the party to automatically trigger invocation of the service 22. For example, in the case of the EUT 10 being a wireless device, such a condition may be low signal strength or a loss of signal that interrupts the call prior to receiving a disconnect signal from one of the parties participating in the call. Optionally, by dialing other prescribed feature codes, a subscriber may elect to set the default state of automatic mid-call hand-offs, e.g., the default state is optionally set to enabled with one feature code and set to disable with another feature code. Suitably, the default state of the service 22 for a particular subscriber is maintained in the subscriber DB 26 along with their other subscription information. Still other feature codes are optionally utilized to override the default state of automatic mid-call hand-offs, e.g., allowing the subscriber to selectively enable and/or disable automatic mid-call hand-offs on a call-by-call basis.

Suitably, the service 22 is only made available to a party if they subscribe thereto. Accordingly, subscription information is maintained in the DB 26 which is queried by the facility 20 to determine the subscription status of the party prior to permitting invocation of the service 22. For example, the subscriber DB 26 optionally has a list stored therein, and/or otherwise maintains data or information that indicates, which terminals and/or users (e.g., identified by their DNs or other like identifiers) served by the facility 20 do and/or do not subscribe to and/or have activated the mid-call hand-off feature. Suitably, the subscriber and/or activation status for the terminal 10 is so listed or indicated in the subscriber DB 26.

In one exemplary embodiment, when the service 22 is invoked, the second or other party (e.g., using an EUT not shown) participating in the call is placed on hold by the facility 20, e.g., via connection to the hold service 24. Optionally, the hold service 24 plays or otherwise provides music or some other audio content to the holding party. For example, the provided content may include an introductory and/or periodic message which indicates that the call has been temporarily suspended and will resume shortly, or some other appropriately informative announcement. Having placed the second party on hold, the other half of the connection to the EUT 10 is optionally broken, torn down, dropped or otherwise released by the facility 20. Alternately, this release is delayed until after the mid-call hand-off is completed or until some other later time after placing the second party on hold.

In the meantime, the facility 20 places a new call to a designated DN, i.e., the DN assigned to the EUT 12 which is to receive the mid-call hand-off. Optionally, the designated DN is obtained by the facility 20 via the subscriber or service invoking party dialing or otherwise entering the desired DN on the EUT 10, e.g., following the activating feature code. Alternately, the designated DN is obtained by the facility 20 from the DB 26 where it is maintained along with the other subscriber information.

Suitably, once the new call has been placed by the facility 20, the holding party is bridged or otherwise connected thereto so as to hear or otherwise receive any call progress tones, e.g., such as ringing, a busy signal, etc. The mid-call hand-off is completed when the subscriber or first party answers the EUT 12 being alerted in response to the new call placed by the facility 20, at which point a connection is established with the second party that has been bridged or connected to the other end of the call.

Figure 2:
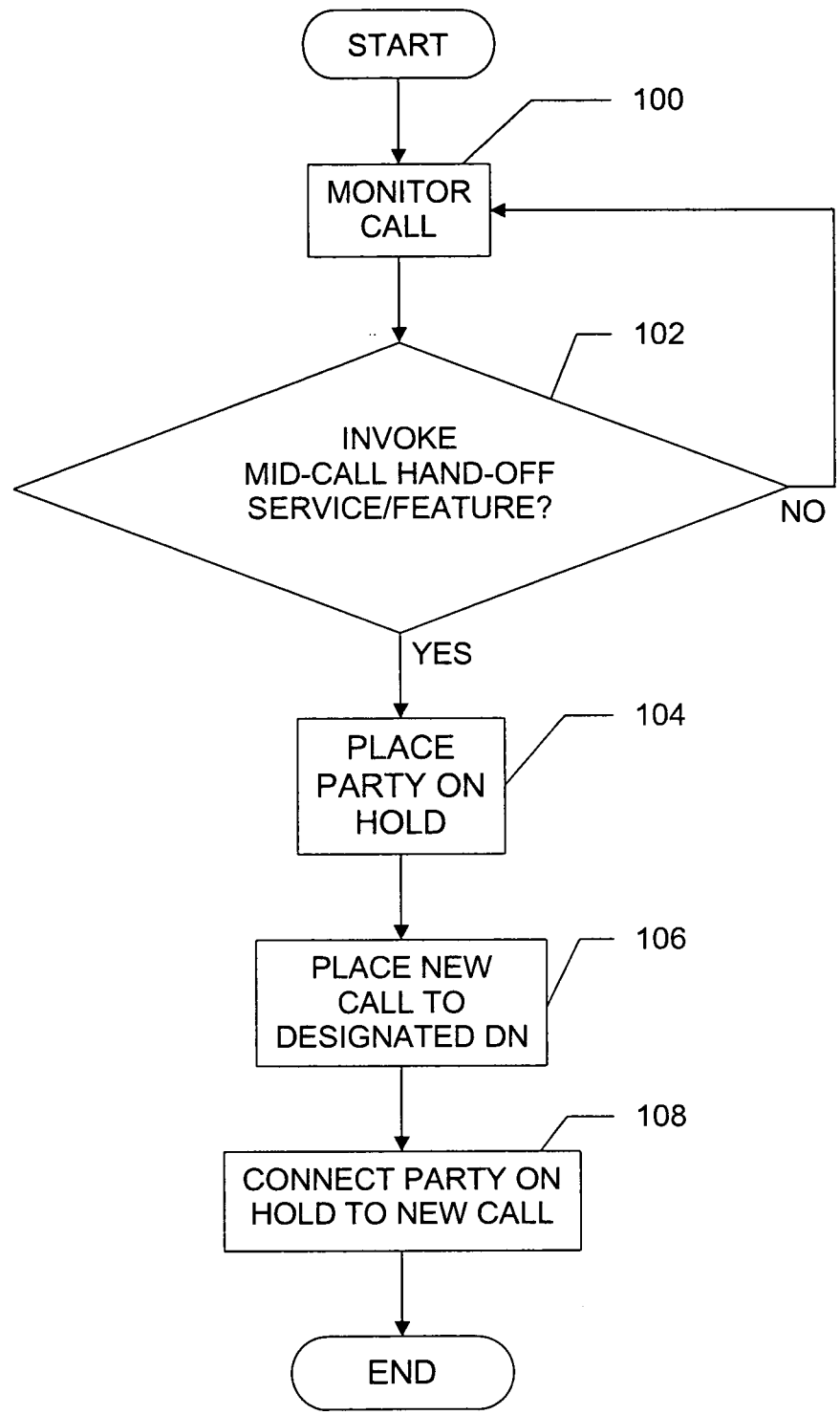
FIG. 2 is a flow chart showing an exemplary mid-call hand-off process embodying aspects of the present inventive subject matter.

With reference to FIG. 2, an exemplary process illustrating the operation of the mid-call hand-off service 22 will now be described. The process starts at step 100 with the facility 20 monitoring a call currently in process and connected through the facility 20 to a first party or EUT 10 served thereby. For purposes of this example, we shall assume the first party subscribes to and/or otherwise has enabled the service 22.

At decision step 102, the facility 20 determines whether or not to invoke or active the mid-call hand-off service 22. For example, the facility 20 optionally decides to automatically invoke the service 22 when a particular detected call condition is observed or sensed, such as low signal strength or a loss of signal. Alternately, the facility 20 decides to invoke the service 22 when so instructed by the first party, e.g., when the facility 20 receives a particular feature code from the EUT 10. If the service 22 is not invoked, then the process loops back to step 100 to monitor for call so long as the call is not otherwise-terminated or the service 22 is not invoked.

On the other hand, if the service 22 is invoked by the facility 20, then the process continues to step 104. At step 104, the facility 20 places a second party participating in the call on hold, e.g., by connecting them to the hold service 24. At step 106, the facility 20 places a new call to a designated DN, e.g., the DN for the EUT 12. For example, the designated DN is optionally obtained from the subscriber DB 26 where it had been previously stored. Alternately, the designated DN is optionally obtained from the first party which optionally dials or otherwise enter the same with the EUT 10, e.g., following an appropriate feature code.

At step 108, the party on hold is bridged or otherwise connected by the facility 20 to the new call placed in step 106. The call now proceeds just as if the second party had called the DN of the EUT 12. In this manner, the mid-call hand-off is completed, assuming of course that the first party answers the EUT 12 being alerted in response to the new call placed by the facility 20

Suitably, in an alternate embodiment, step 104 is optionally omitted. Rather, once the service 22 is invoked, the facility 20 places a new call to the designated DN (e.g., to the DN for the EUT 12) using an open line. Accordingly, the EUT 12 is alerted in response to this new incoming call. Presuming the first party answers the incoming call on the EUT 12, the facility 20 detects the answered call and in response thereto bridges or otherwise connects the second party directly to the newly established call, i.e., without first putting them on hold. Optionally, the prior call is not terminated or otherwise released until the facility 20 completes the connection between the first and second parties on the new call. Accordingly, if the first party for some reason is unable to or otherwise does not answer the new incoming call on the EUT 12, then the prior call is maintained, absent some other cause for termination. Suitably, completion of the new call placed by the facility 20 is attempted for a set number of rings or a given time period following invocation of the service 22, after which the mid-call hand-off times out or the service 22 otherwise gives up.

As can be appreciated from the examples herein and the illustrated embodiments, the mid-call hand-off feature can be successfully implemented even if the switching facility 30 serving the EUT 12 to which the call is handed does not support such a feature, so long a the facility 20 serving the EUT 10 from which the call is being handed-off does support the feature. Accordingly, roll out of the feature is not strictly contingent upon widespread adoption or universal implementation among switching facilities.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of providing a mid-call transfer feature from an end user terminal participating in a call in a telecommunications network to another end user terminal, the method comprising:
 (a) connecting a first call through a first switching facility of the telecommunications network such that a first party using a first end user terminal served by the first switching facility and a second party are participating in the first call;

(b) sensing a call condition prearranged to trigger the mid-call transfer feature with respect to the first end user terminal, where the call condition is sensed at the first switching facility and different from a feature code to invoke the mid-call transfer feature;

(c) automatically invoking the mid-call transfer feature for the first end user terminal based on the sensed call condition;

(d) placing a second call from the first switching facility to a designated telephone number associated with a second end user terminal; and, (e) connecting the second party to the second call and proceeding as if the second party had called the designated telephone number associated with the second end user terminal.

2. The method of claim 1, further comprising:
placing the second party on hold in relation to the sensed call condition in (b) and prior to placing the second call in (d).

3. The method of claim 2, further comprising:
releasing the first end user terminal from the first call after the second party has been placed on hold.

4. The method of claim 1, further comprising:
completing a mid-call terminal transfer from the first end user terminal of the first call to the second end user terminal of the second call in response to an answering of the second call at the second end user terminal.

5. The method of claim 1, wherein (b) and (c) are carried out while the first call between the first party using the first end user terminal and the second party remains in progress.

6. The method of claim 1, further comprising:
obtaining the designated telephone number from the first party via the first end user terminal.

7. The method of claim 1, further comprising:
obtaining the designated telephone number from a subscriber database having the designated telephone number stored therein.

8. The method of claim 1, wherein the sensed call condition in (b) includes a low signal strength for the first call or a loss of signal for the first call.

9. The method of claim 1, wherein the second end user terminal is served by a second switching facility different than the first switching facility.

10. The method as set forth in claim 9 wherein the first switching facility supports the mid-call transfer feature and the second switching facility does not support the mid-call transfer feature.

11. The method of claim 1, wherein (e) is completed in response to the first party answering the second call at the second end user terminal.

12. The method as set forth in claim 1 wherein the second party is not placed on hold during any of (b) through (e).

13. The method as set forth in claim 1, further comprising:
releasing the first end user terminal from the first call in relation to the sensed call condition in (b) and prior to placing the second call in (d).

14. A system providing a mid-call transfer service from an end user terminal participating in a call in a telecommunications network to another end user terminal, the system comprising:
connecting means for connecting a first call through a first switching facility of the telecommunications network such that a first party using a first end user terminal served by the first switching facility and a second party are participating in the first call;

sensing means for sensing a call condition prearranged to trigger the mid-call transfer service with respect to the first end user terminal, where the call condition is sensed at the first switching facility and different from a feature code to invoke the mid-call transfer service;

invoking means for automatically invoking the mid-call transfer service for the first end user terminal based on the sensed call condition;

calling means for placing a second call from the first switching facility to a designated telephone number associated with a second end user terminal in response to invocation of the mid-call transfer service; and, bridging means for bridging the second party to the second call after the second call has been placed such that the second call proceeds as if the second party had called the designated telephone number associated with the second end user terminal.

15. The system of claim 14, further comprising:
holding means for placing the second party on hold in relation to the sensed call condition and before the second call is placed.

16. The system of claim 15, wherein the connection means releases the first end user terminal from the first call after the second party has been placed on hold.

17. The system of claim 14 wherein the bridging means completes a mid-call terminal transfer from the first end user terminal of the first call to the second end user terminal of the second call in response to an answering of the second call at the second end user terminal.

18. The system of claim 14 wherein the bridging means connects the second call in response to the first party answering the second call at the second end user terminal.

19. The system as set forth in claim 14 wherein the connection means releases the first end user terminal from the first call in relation to the sensed call condition and prior to placing the second call.

20. A switching facility providing a mid-call transfer service from an end user terminal participating in a call in a telecommunications network to another end user terminal, the switching facility comprising:
connecting means for connecting a first call through a switching facility such that a first party using a first end user terminal and a second party are connected on the first call;

sensing means for sensing a call condition prearranged to trigger the mid-call transfer service, where the call condition is sensed at the switching facility and different from a feature code to invoke the mid-call transfer service;

invoking means for automatically invoking the mid-call transfer service based on the sensed call condition;

calling means that placing a second call from the switching facility to a designated telephone number associated with a second end user terminal in response to invocation of the mid-call transfer service; and, bridging means for bridging the second party to the second call after the second call has been placed such that the second call proceeds as if the second party had called the designated telephone number associated with the second end user terminal.

* * * * *